United States Patent
Barritault et al.

(10) Patent No.: US 12,304,387 B2
(45) Date of Patent: May 20, 2025

(54) VEHICLE STEERING WHEEL MOUNTED ACOUSTIC WARNING DEVICE HAVING NORMALLY CLOSED CONTACTS

(71) Applicant: Autoliv Development AB, Vargarda (SE)

(72) Inventors: Matthis Barritault, Poitiers (FR); Thomas Letierce, Vouneuil s/Biard (FR)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 17/754,829

(22) PCT Filed: Oct. 13, 2020

(86) PCT No.: PCT/EP2020/078691
§ 371 (c)(1),
(2) Date: Apr. 13, 2022

(87) PCT Pub. No.: WO2021/074103
PCT Pub. Date: Apr. 22, 2021

(65) Prior Publication Data
US 2024/0101027 A1  Mar. 28, 2024

(30) Foreign Application Priority Data
Oct. 18, 2019 (FR) ..................................... 1911724

(51) Int. Cl.
*B60Q 5/00* (2006.01)

(52) U.S. Cl.
CPC .................................. *B60Q 5/003* (2013.01)

(58) Field of Classification Search
CPC ............... B60Q 5/003; B60R 21/2037; B60R 21/21658; B60R 16/005; B60R 16/027; B62D 1/046
See application file for complete search history.

(56) References Cited

U.S. PATENT DOCUMENTS

| | | | |
|---|---|---|---|
| 11,420,554 B2* | 8/2022 | Groleau | B60Q 5/003 |
| 11,498,481 B2* | 11/2022 | Osterfeld | B60Q 5/003 |
| 11,511,665 B2* | 11/2022 | Bertrand | B60Q 5/003 |
| 11,548,439 B2* | 1/2023 | Barritault | B60Q 5/003 |
| 11,833,962 B2* | 12/2023 | Bertrand | B60Q 5/003 |

FOREIGN PATENT DOCUMENTS

| | | |
|---|---|---|
| DE | 948216 C | 8/1956 |
| EP | 1099604 A2 | 5/2001 |
| FR | 3063942 A1 | 9/2018 |
| FR | 3071453 A1 | 3/2019 |
| JP | 2017197185 A | 11/2017 |

* cited by examiner

*Primary Examiner* — Vanessa Girardi
(74) *Attorney, Agent, or Firm* — Matthew D. Thayne; Thayne and Davis LLC

(57) ABSTRACT

An acoustic warning device for a motor vehicle, having: a base part, a mobile control part, an electrical command detection circuit with at least two switches, the switches are normally closed switches, and the two switches are connected in series, in that at least one of the switches has two contacts that are isolated from one another.

15 Claims, 9 Drawing Sheets

[Fig. 1]
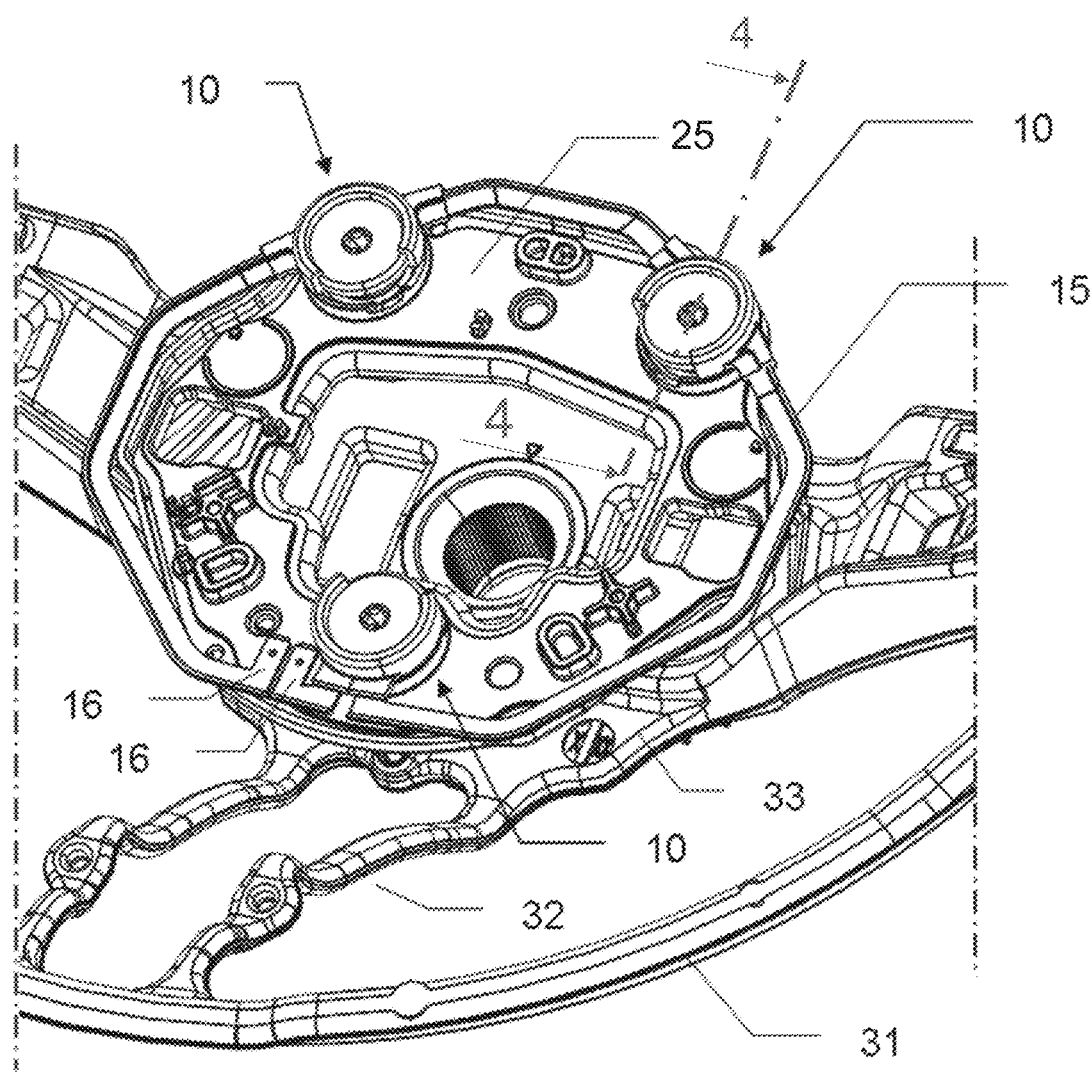

[Fig. 2]
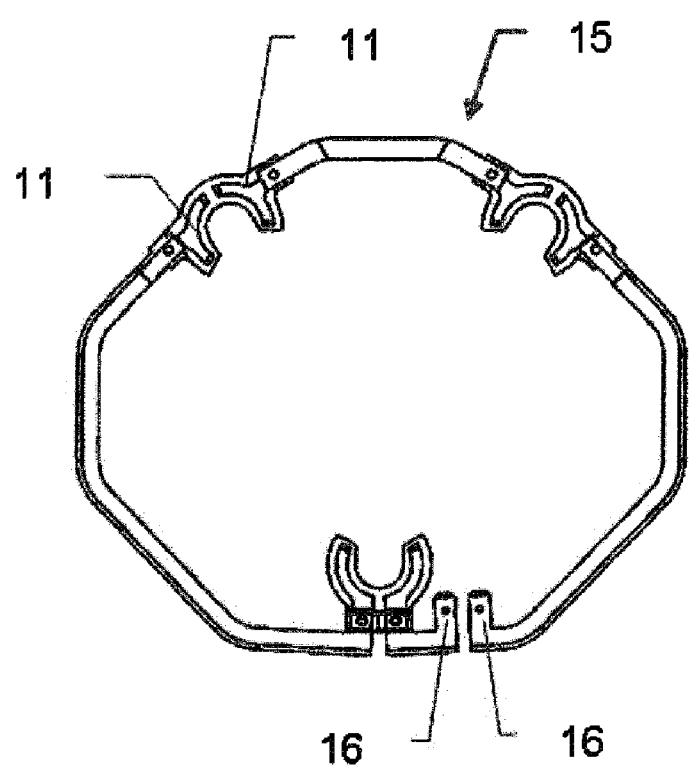

[Fig. 3]
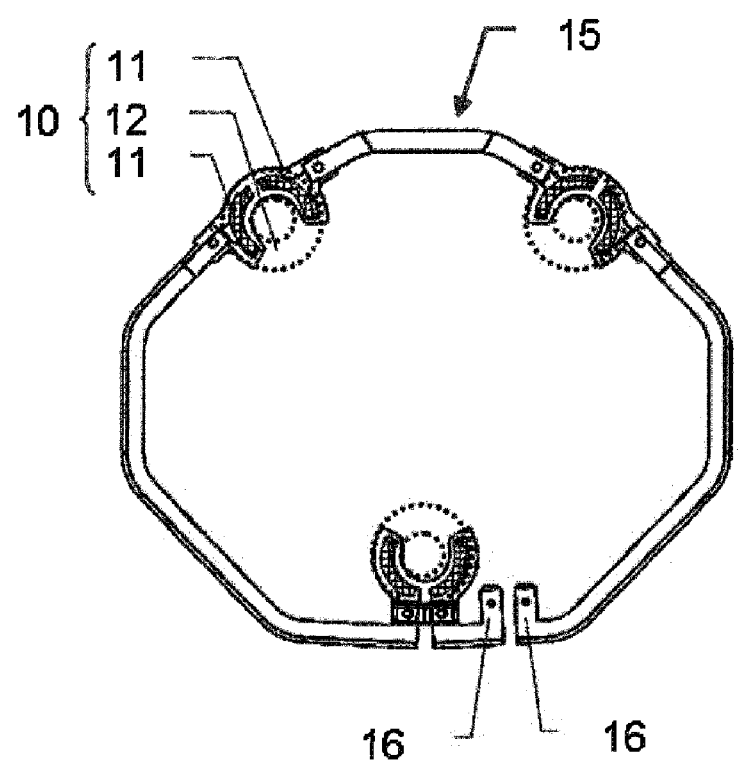

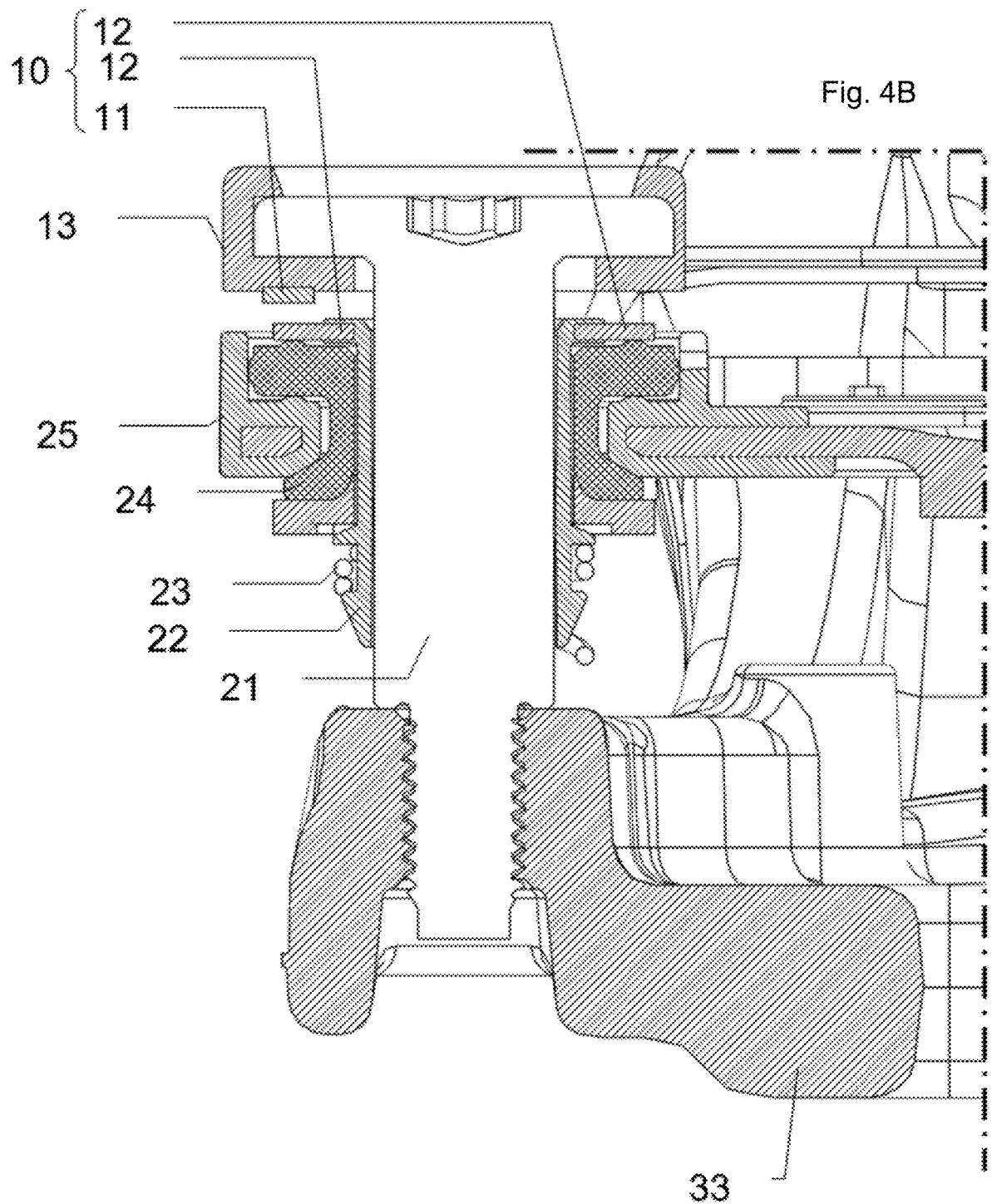

[Fig. 5]
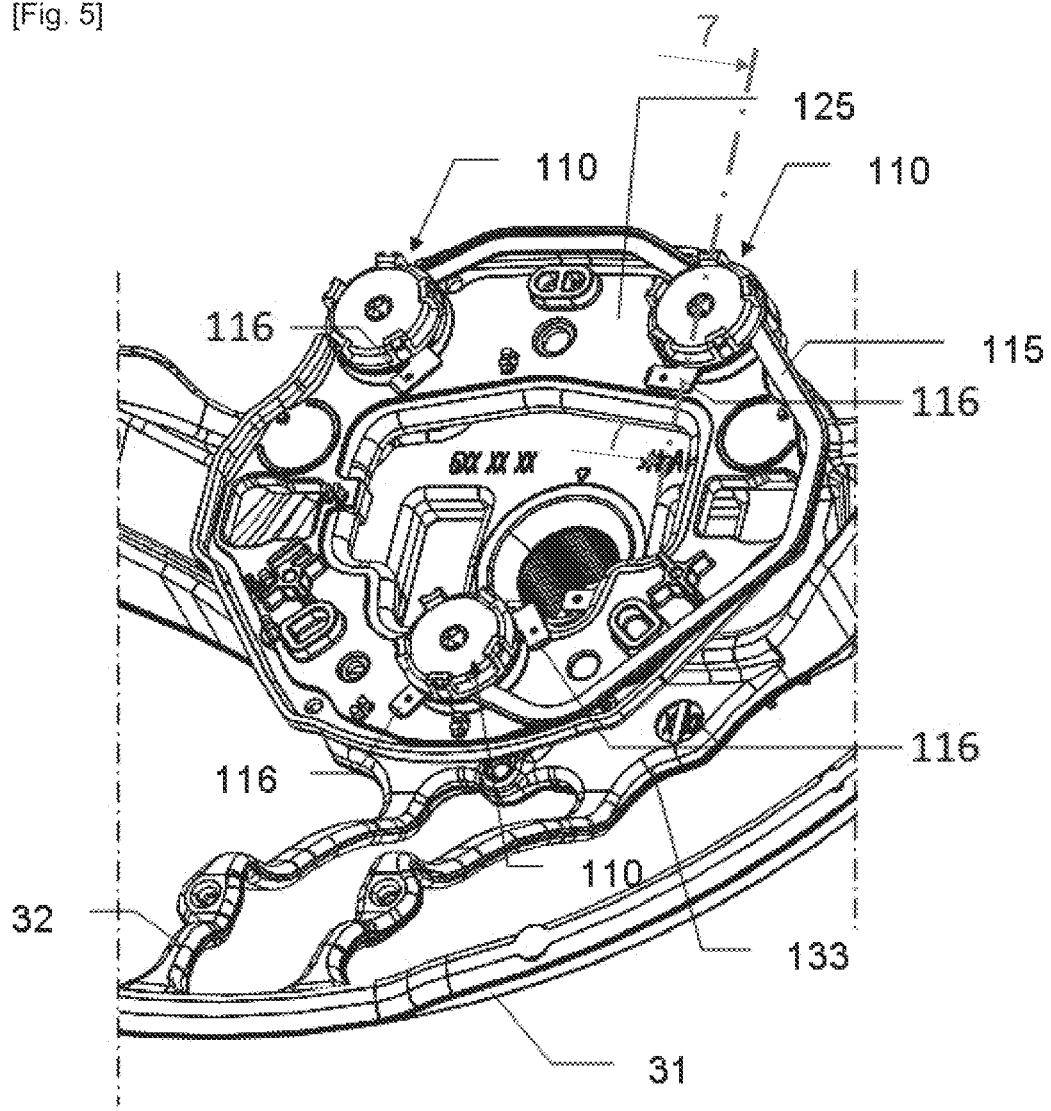

[Fig. 6]
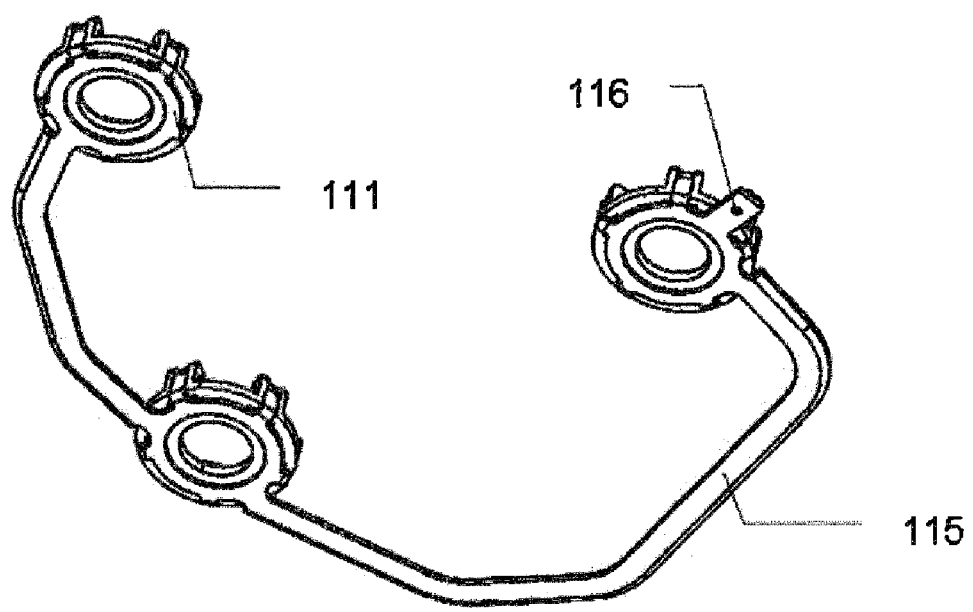

[Fig. 8]
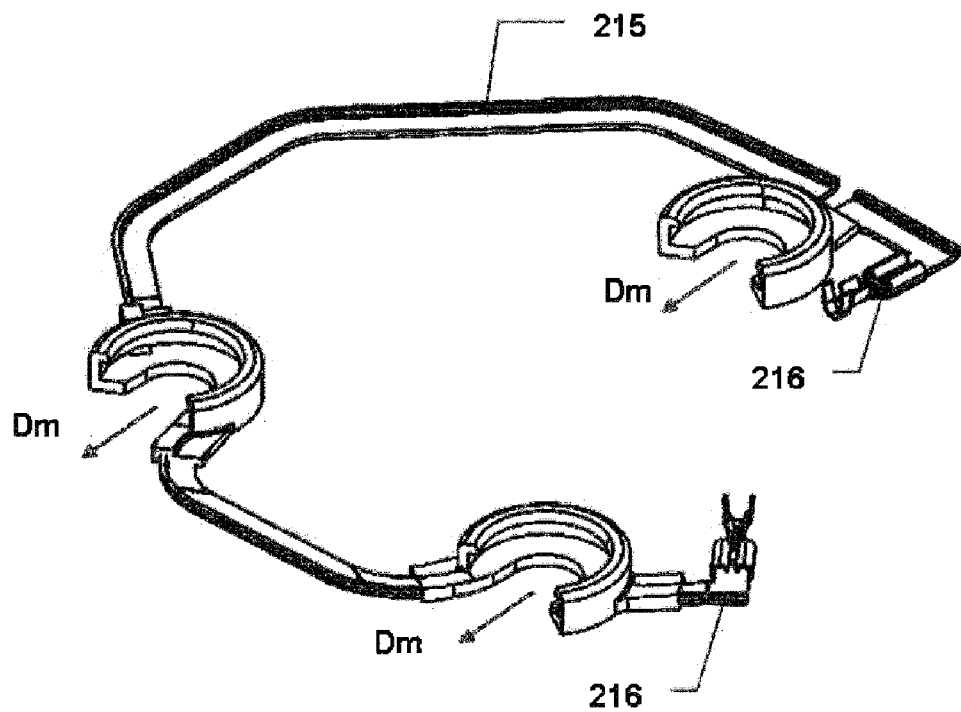

VEHICLE STEERING WHEEL MOUNTED ACOUSTIC WARNING DEVICE HAVING NORMALLY CLOSED CONTACTS

The present invention typically relates to the field of acoustic warning devices for motor vehicles, and in particular, the invention relates to the field of acoustic warning devices installed in the steering wheel of the vehicle.

It is known in the background art to propose acoustic warning devices with control devices integrated into the steering wheel, such as that disclosed for example in document FR3063942, comprising a mobile control part to be pressed by a user in order to trigger the operation of the acoustic warning device. In contrast, this system imposes the provision of multiple manual connections with the vehicle's on-board circuit in order to supply the electrical circuit of the acoustic warning control comprising one or more switches. Typically, at least two manual connections must be provided per switch, as there are two connecting pins per switch to be connected to the on-board circuit.

However, it is important to detect the movement of the control part as quickly as possible, regardless of the area pressed by the driver, which may result in numerous switches being distributed over the entire surface of the control part. Regardless of the area pressed, an adjacent switch will thus detect the movement and may trigger the operation. However, such an implementation still leads to an increased number of manual connection points. The manufacturing method thus requires numerous manual connection operations, which increases the manufacturing time, the potential number of errors and the total cost.

One purpose of the present invention is to respond to the disadvantages of the background art mentioned hereinbefore and in particular, firstly, to propose an acoustic warning device which comprises an effective control device for quickly detecting the movement of a control part to be actuated by a user, and which, however, has a simple assembly process, with a limited number of connections to be made.

To do this, a first aspect of the invention relates to an acoustic warning device for a motor vehicle (or an acoustic warning control device), comprising:
  a base part,
  a control part, which is movable with respect to the base part, between a rest position and a pressed position,
  an electrical command detection circuit with at least two switches, each switch being arranged to change status when the control part transitions from the rest position to the pressed position,
wherein the switches are normally closed switches when the control part is in the rest position,
characterized:
  in that said at least two switches are connected in series,
  in that at least one of the switches comprises two contacts that are isolated from one another and arranged on one of the base part-control part assembly, and a contact bridge arranged on the other one of the base part-control part assembly, the contact bridge being arranged to connect the two contacts when said at least one switch is closed.

According to the implementation hereinbefore, the switches are connected in series, which ensures the immediate detection of a status change (the complete circuit is open as soon as one of the switches is open). In addition, at least one of the switches comprises a bridge embedded in one of the base part-control part assembly and two contacts embedded in the other one of the base part-control part assembly, the contacts being arranged to be connected/disconnected by the bridge, which, in conjunction with the connection in series, does away with at least one connection to be made by the assembly operator (since, due to the construction, the circuit has switches in series).

Advantageously, the electrical detection circuit may comprise three switches. The detection is efficient, as three switches distributed over the steering wheel make it possible to detect any movement of the control part, and due to the architecture in series, the number of connections to be made by the assembly operator is not increased, i.e., only two connection terminals are required.

Advantageously, each switch may comprise two contacts isolated from one another on one of the base part-control part assembly, and a contact bridge on the other one of the base part-control part assembly, the contact bridge being arranged to connect the two contacts when said at least one switch is closed. In conjunction with the architecture in series, only two manual connections need to be made with this implementation.

Advantageously, the electrical detection circuit may comprise only two connection terminals to an electrical network on-board the vehicle. In other words, a manufacturing operator only has two manual connections to make when assembling the steering wheel, even if there are several switches for detecting the movement of the control part.

Advantageously, each switch may have a contact connected in series with a contact of an adjacent switch of the command detection circuit.

According to one implementation, said two contacts isolated from one another are arranged on the base part, and said contact bridge is arranged on the control part. According to the implementation hereinbefore, the contacts of the switch(es) are integrally formed with the base part, and are therefore static with respect to the latter. Consequently, only the contact bridge(s) is (are) integrally formed with the control part and movable. This minimizes the vibrations and/or movements of the contacts and strands or portions of the circuit which links them, such that the reliability is improved (reduced risk of mechanical stress, interference, friction, noise, etc.).

Advantageously, the command detection circuit may comprise a branch consisting of circuit strands, with at least two adjacent circuit strands which may each comprise at one end one of the contacts of the same switch, the contacts isolated from one another being able to be arranged opposite the contact bridge of said switch. The branch is therefore a unique component which comprises several circuit strands which connect each switch in series, and it is sufficient to provide two connection terminals to allow two manual connections. Thus the system is very simple to manufacture, but allows multiple switches to be provided in order to achieve sensitive and effective command detection. In other words, the branch in question is a portion of the electrical command detection circuit and may be defined in the following manner: between two connection points (or two nodes) of the electrical circuit, the branch comprises several conductors (circuit or conductor strands) which connect one contact of one switch to one contact of another switch in pairs.

Advantageously the branch can be formed of a drawn metal sheet or a bent metal wire.

Advantageously, the branch can form a connection hoop or arch, and the connection hoop or arch can form an independent part to be attached to the steering wheel. In other words, the connection hoop or arch can embed all the contacts of each of the switches and the circuit strands connecting them, in order to form a one-piece unit which is easy for the assembly operators to handle.

Advantageously, the branch can comprise an insulating material forming a substrate supporting the contacts isolated from one another arranged opposite the contact bridge of said switch.

Advantageously, the branch can comprise at least one insulating shell partially overmolded around the contacts isolated from one another arranged opposite the contact bridge of said switch.

Advantageously, the acoustic warning device can comprise at least one reference protuberance, and the insulating shell can comprise elastic retaining or interlocking means, arranged so as to be elastically attached to the reference protuberance. According to the implementation hereinbefore, the assembly is rapid and simple, since the reference protuberance ensures indexing on or around which the operator inserts or fits the insulating shell. The protuberance may be a screw head, in particular a shoulder screw head which moreover provides a guide portion for the control part.

According to one implementation, the acoustic warning device may comprise several reference protuberances, and the insulating shell may comprise elastic retaining or interlocking means, arranged so as to be elastically attached to each of the reference protuberances, and preferably according to the same assembly direction.

For example, provision may be made for each insulating shell to be C-shaped or with an open neck typically with an opening to interlock with each reference protuberance, and the opening in each mounting interface is directed in the same direction. This facilitates assembly in a single movement, without deforming the hoop.

Advantageously, the acoustic warning device may comprise at least one guide unit for the control part, the guide unit comprising at least one mechanical stop in order to define the rest position, and:
  one of the assembly of two isolated contacts-contact bridge is embedded on the control part,
  the other one of the assembly of two isolated contacts-contact bridge is integrally formed with the mechanical stop.

Advantageously, the acoustic warning device may comprise as many guide units as switches, and for each switch:
  one of the assembly of two isolated contacts-contact bridge is embedded on the control part,
  the other one of the assembly of two isolated contacts-contact bridge is integrally formed with the mechanical stop of a guide unit.

The guidance of the control part is precise, as several guide units are provided, and the detection of the command is very efficient, as one switch is provided at each guide unit.

Advantageously, the other one of the assembly of two isolated contacts-contact bridge integrally formed with the mechanical stop may be electrically isolated from the guide unit.

A second aspect of the invention relates to a vehicle steering wheel comprising an acoustic warning device according to the first aspect.

Advantageously, the vehicle steering wheel may comprise a safety module attached to the control part.

A third aspect of the invention relates to a motor vehicle comprising a vehicle steering wheel according to the second aspect.

Other characteristics and advantages of the present invention will become more apparent upon reading the detailed description of several embodiments of the invention, which are provided by way of example but in no manner limited thereto, and illustrated by the attached drawings, in which:

FIG. 1 depicts a perspective view of part of an acoustic warning device, or part of a control device for an acoustic warning device, embedded on a vehicle steering wheel;

FIG. 2 depicts a connection hoop forming part of the acoustic warning device of FIG. 1, FIG. 3 depicts the connection hoop of FIG. 2, to show an interaction with components of FIG. 1;

FIG. 4B depicts a cross-section of the acoustic warning device of FIG. 1 in a pressed position;

FIG. 5 depicts a perspective view of an alternative of part of an acoustic warning device, embedded on a vehicle steering wheel;

FIG. 6 depicts a connection hoop forming part of the alternative acoustic warning device of FIG. 5.

FIG. 8 depicts an alternative implementation of the connection hoop of FIG. 2.

Figure 4A:
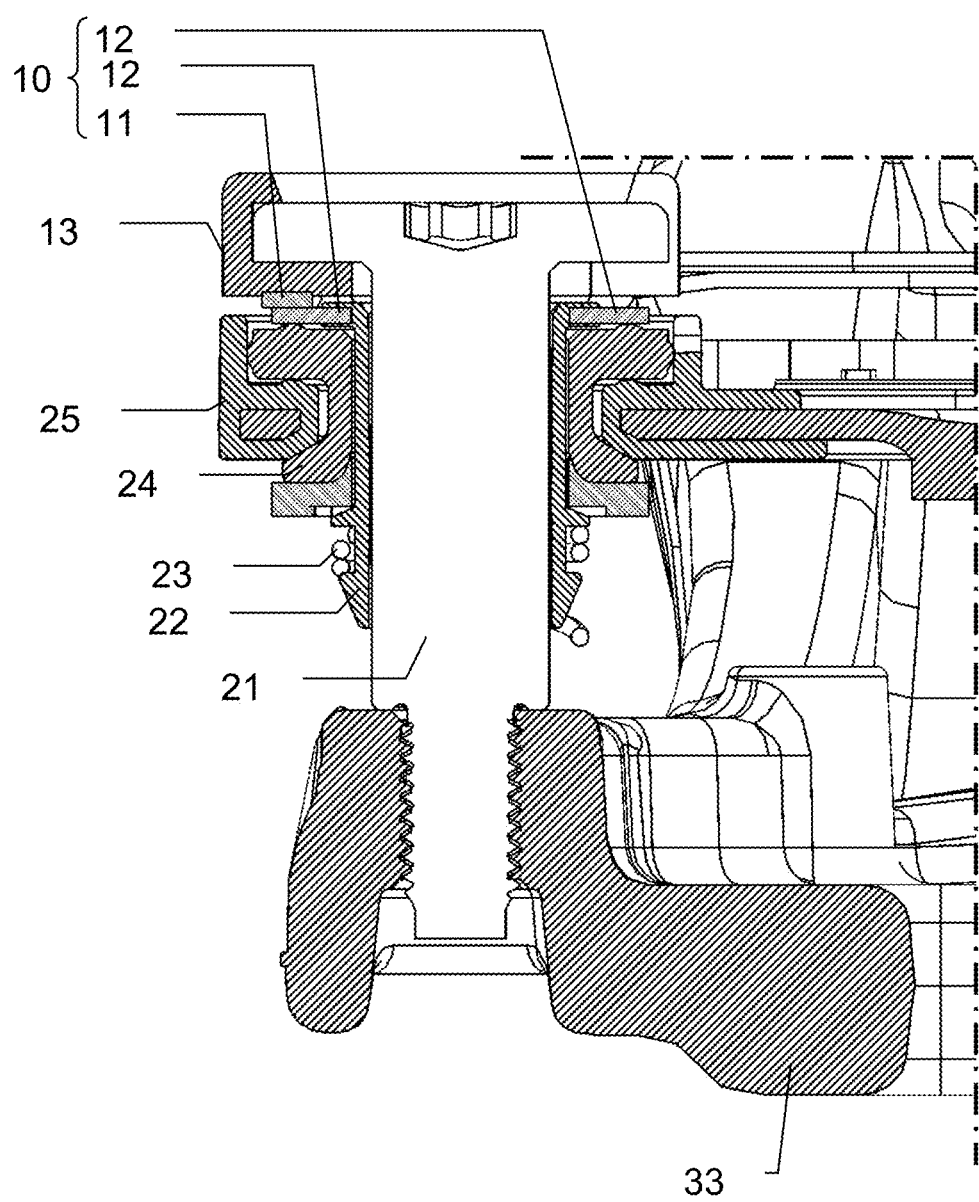
FIG. 4A depicts a cross-section of the acoustic warning device of FIG. 1.

FIG. 1 depicts a perspective view of part of an acoustic warning device comprising three switches 10 formed at three guide units of a movable control part 25 embedded on a vehicle steering wheel comprising notably a frame consisting of a hub (forming a base part 33), branches 32 and a rim 31.

The control part 25 is a plate which typically receives a safety module (an airbag), and which is movably mounted on the hub of the steering wheel frame. In a conventional manner, the control part 25 is movable between a rest position (FIG. 1) and a pressed position; when the driver wants to activate the acoustic warning device.

In order to detect this control movement, the acoustic warning device comprises three switches 10 which are normally closed (when the control part 25 is in the rest position), and which open during the transition to the pressed position. Thus, the detection is rapid (the status change of the switches 10 occurs as soon as the control part 25 leaves the rest position).

In order to limit the manual connection operations, provision is made to connect the three switches 10 in series, which allows for the provision of only two connection terminals 16 for connecting the switches 10 to the rest of the vehicle's on-board circuit.

Specifically, as depicted in FIGS. 2 and 3, each switch 10 comprises two contacts 11, isolated from one another. Furthermore, provision is made for a contact bridge 12 (which can be seen in FIG. 3 and especially in FIG. 4) arranged to connect the two contacts 11 together, when the switch 10 is closed. As a result, it is possible to provide a connection hoop 15 which is detailed in FIGS. 2 and 3, which connects the contacts 11 of two switches 10 in pairs, and which comprises the only two connection terminals 16 to be connected manually during assembly of the vehicle steering wheel. The dotted line of FIG. 3 shows the silhouette of the contact bridge 12 of each switch 10, and the electrical contact zones are shown as hatched, when the switches 10 are closed (the control part 25 is therefore in the rest position).

The connection hoop 15 therefore comprises the contacts 11 of each switch 10, and provision is also made for a collar 13 at the contacts 11 and clearly visible in FIG. 4 (which depicts a cross-section of a guide unit for the control part 25), which flexibly fits onto the head 21T of a guide screw 21 which is screwed into the hub of the frame. Thus, it is easy to mount the connection hoop 15 on the steering wheel.

It is further noted that the connection hoop is fixedly mounted on the hub; it therefore does not move during the acoustic warning commands, and it is less exposed to vibrations, which limits the mechanical/vibratory stress and the risk of noise. The service life is improved. Consequently, only the contact bridges 12 are movable in this implementation, and no electrical cable is therefore movable, which typically improves reliability (reduced risk of noise, friction, spurious movement, etc.).

In addition, FIG. 4 shows the construction details of the guide units for the control part 25 which is movable. Around the shoulder guide screw 21, provision is made for a return spring 23, a slider 22, and a damper 24 for guiding the control part 25.

Returning to FIG. 1, it can be noted that three guide units are provided, each with a switch 10, which guarantees that the movement of the control part 25 will be immediately detected, regardless of the position at which the driver presses, because the switches 10 are normally closed and all connected in series: as soon as one of the switches 10 opens, the entire circuit is open. Furthermore, there are only two connection terminals 16 to be connected manually during assembly of the depicted steering wheel.

FIG. 8 shows an alternative embodiment of the hoop 15 of FIG. 2. In fact, the hoop 215 of FIG. 8 can completely replace the hoop 15 of FIG. 2 in the assembly of FIG. 1 or 4. The difference to be noted relates to the shells which overmold the contacts of each switch.

In fact, each shell is C-shaped (as in FIG. 2), but in FIG. 8, the openings of each C are all oriented in a single assembly direction Dm. Simplified assembly is thus possible. The hoop 215 can be attached to the shoulder screws according to a single movement in the assembly direction Dm.

Provision can also be made to fit all the shoulder guide screws 21 and the control part 25 on the base part 33 in order to then attach the hoop 215 and connect it via the connection terminals 216. In the example depicted, the assembly direction Dm is contained in a plane perpendicular to the shoulder guide screws 21, but other orientations and assembly directions may be provided.

It should be noted that the contacts 11 of the hoop 215 are not visible in FIG. 8, as they are arranged at the lower surface of the insulating shells or overmoldings, which is hidden in this FIG. 8.

Figure 7:
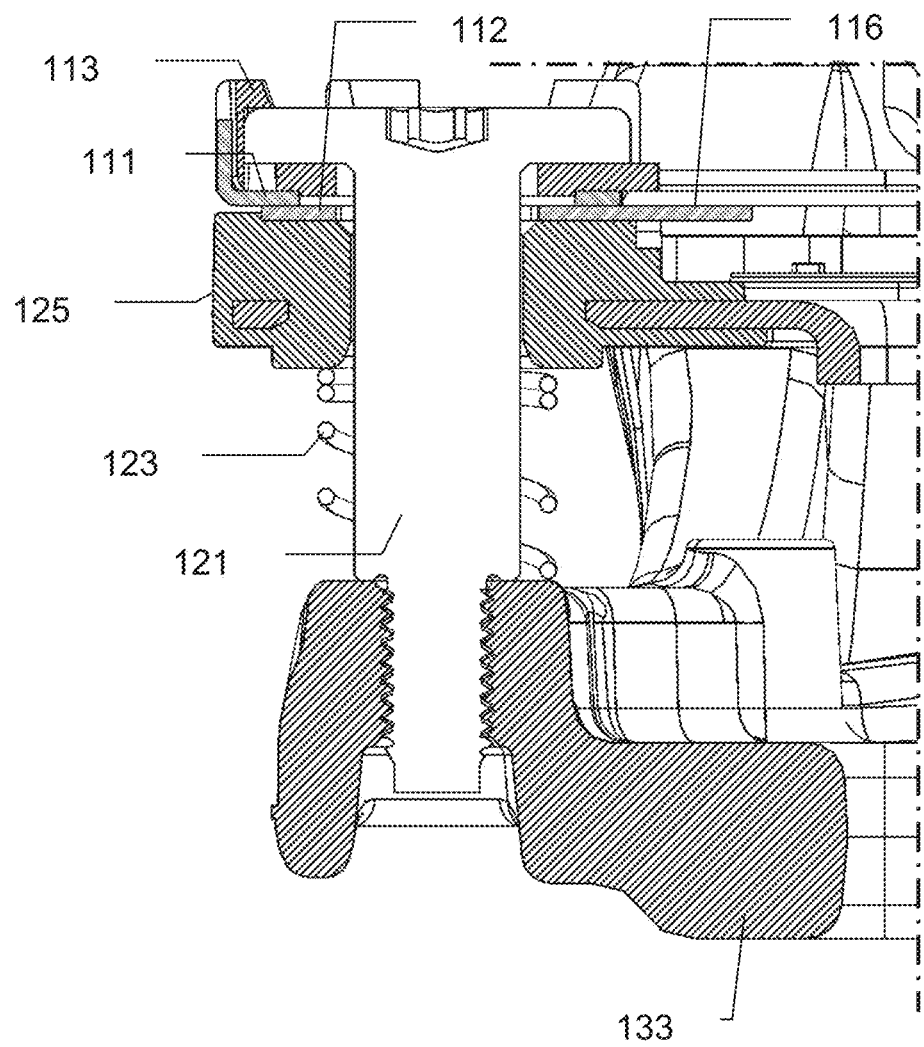
FIG. 7 depicts a cross-section of the acoustic warning device of FIG. 5.

FIGS. 5, 6 and 7 depict an alternative embodiment. A control part 125 is movably mounted on three guide units, each of which bear a switch 110.

As shown in FIG. 7, each guide unit herein consists of a guide screw 121, which forms a slide rail for the control part 125, and a spring 123 is fitted between the hub (the base part 133) and the control part 125 in order to push it back into the rest position (upward, as depicted in FIG. 7).

Furthermore, each switch 110 comprises a fixed contact 111 integral with a head 121T of a guide screw 121 and a mobile contact 112 integral with the control part 125. A connection hoop 115 shown in FIG. 6 connects the fixed contacts 111 in series, which allows for the provision of just one single connection terminal 116 for the three fixed contacts 111. Moreover, in FIGS. 4 and 7 FIGS. 4 and 7, it is possible to see that each mobile contact has a connection terminal 116. In total in this embodiment, four connection terminals 116 must be connected manually (instead of six if each switch were to have two connection terminals, as known in the background art).

It will be understood that various modifications and/or improvements which are obvious for the person skilled in the art may be made to the different embodiments of the invention described in this present description without departing from the scope of the invention.

The invention claimed is:

1. An acoustic warning device for a motor vehicle, comprising:
   a base part,
   a control part, which is movable with respect to the base part, between a rest position and a pressed position,
   an electrical command detection circuit with at least two switches, each switch being arranged to change status when the control part transitions from the rest position to the pressed position,
   wherein the switches are normally closed switches when the control part is in the rest position, characterized:
   in that the two switches are connected in series,
   in that at least one of the switches comprises two contacts that are isolated from one another and arranged on one of the base part-control part assembly, and a contact bridge arranged on the other one of the base part-control part assembly, the contact bridge being arranged to connect the two contacts when said at least one switch is closed, wherein the electrical command detection circuit comprises a connection hoop or arch comprising embedded circuit strands and contacts for each of the switches and forms an independent part to be attached to a steering wheel and is fixedly mounted on the base part.

2. The acoustic warning device according to claim 1, wherein the electrical detection circuit comprises three switches.

3. The acoustic warning device according to claim 1, wherein the connection hoop or arch comprises the two contacts of a single switch that are isolated from one another with the two contacts of the single switch being arranged opposite the contact bridge.

4. The acoustic warning device according to claim 1, wherein only the contact bridge of electrical command detection circuit is movable when the control part transitions from the rest position to the pressed position.

5. The acoustic warning device according to claim 1, comprising at least one guide unit for the control part, the guide unit comprising at least one mechanical stop in order to define the rest position, and wherein:
   one of the assembly of two isolated contacts-contact bridge is embedded on the control part,
   the other one of the assembly of two isolated contacts-contact bridge is integrally formed with the mechanical stop.

6. The acoustic warning device according to claim 5, comprising as many guide units as switches, and wherein, for each switch:
   one of the assembly of two isolated contacts-contact bridge is embedded on the control part,
   the other one of the assembly of two isolated contacts-contact bridge is integrally formed with the mechanical stop of a guide unit.

7. The acoustic warning device according to claim 5, wherein the other one of the assembly of two isolated contacts-contact bridge integrally formed with the mechanical stop is electrically isolated from the guide unit.

8. A vehicle steering wheel comprising an acoustic warning device according to claim 1.

9. The vehicle steering wheel according to claim 8, comprising a safety module attached to the control part.

10. A motor vehicle comprising a vehicle steering wheel according to claim 8.

11. The acoustic warning device according to claim 1, wherein each switch comprises two contacts isolated from one another on one of the base part—control part assembly, and a contact bridge on the other one of the base part—control part assembly, the contact bridge being arranged to connect the two contacts when said at least one switch is closed.

12. The acoustic warning device according to claim 11, wherein each switch has a contact connected in series with a contact of an adjacent switch of the command detection circuit.

13. The acoustic warning device according to claim 12, wherein the command detection circuit comprises a branch consisting of circuit strands, with at least two adjacent circuit strands each comprising at one end one of the contacts of the same switch, the contacts isolated from one another being arranged opposite the contact bridge of said switch.

14. The acoustic warning device according to claim 13, wherein the branch comprises an insulating material forming a substrate supporting the contacts isolated from one another and arranged opposite the contact bridge of said switch.

15. The acoustic warning device according to claim 13, wherein the branch comprises at least one insulating shell partially overmolded around the contacts isolated from one another and arranged opposite the contact bridge of said switch.

\* \* \* \* \*